(No Model.)
G. YEOMANS.
MECHANICAL MOVEMENT.
No. 292,974. Patented Feb. 5, 1884.
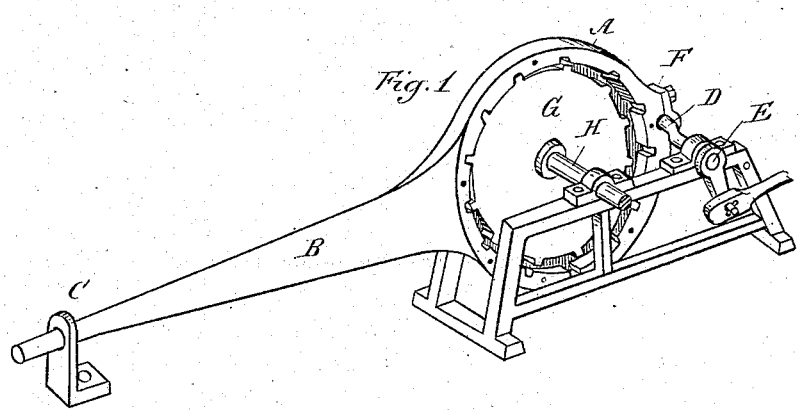
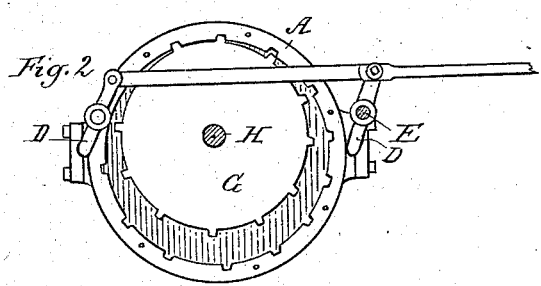
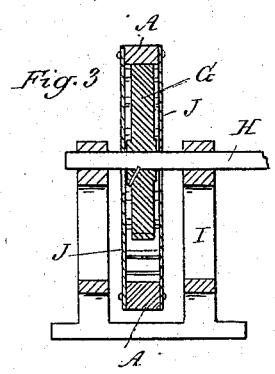
Attest:
John Henry
E. Scully
Inventor:
George Yeomans
by his Att'y Th'o L. Sprague

UNITED STATES PATENT OFFICE.

GEORGE YEOMANS, OF WAYNE, MICHIGAN.

MECHANICAL MOVEMENT.

SPECIFICATION forming part of Letters Patent No. 292,974, dated February 5, 1884.

Application filed November 3, 1883. (No model.)

*To all whom it may concern:*

Be it known that I, GEORGE YEOMANS, of Wayne, in the county of Wayne and State of Michigan, have invented new and useful Improvements in Mechanical Movements; and I do hereby declare that the following is a full, clear, and exact description thereof, reference being had to the accompanying drawings, which form a part of this specification.

This invention relates to an improvement in mechanical movements; and the object of my invention is to obviate the use of multiple gearing in certain classes of machines where such gearing is objectionable on account of its liability to be injured by foreign objects being drawn between the cogs—as, for example, in traction-engines, where a number of gear-wheels are employed for "gearing down" to give the necessary power, and where such gear-wheels prove cumbersome and unsafe.

In the drawings which accompany this specification, Figure 1 is a perspective view of my mechanical movement. Fig. 2 is an elevation embodying a modification thereof, and Fig. 3 is a cross-section on line X X in Fig. 2.

A is an internal gear-wheel, provided with an extension or guide, B, the free end of which is supported in a rest, C.

E is a drive-shaft provided with the crank D, to which the internal gear-wheel, A, is secured by means of a suitable box, F.

G is a gear-wheel, the diameter of which is equal to the diameter of the internal gear, less the amount of throw of the crank D. The gear-wheel G is secured upon a shaft, H, which is journaled in the frame I.

In practice, if motion is given to the shaft E, the crank D will communicate this motion to the internal gear-wheel, A, which in turn will be actuated with a circular motion in the manner of the strap of an eccentric, and by the engagement with the gear-wheel will produce a continuous rotary motion at equal speed of the gear-wheel G and shaft H. With each revolution of the shaft E a point in the periphery of the wheel G will travel a distance equal to the travel of the crank D. Therefore if the relative proportion between the length of travel of the crank D at one revolution and the pitch-line of the gear-wheel is as one to twelve, a gearing down of one to twelve is obtained. The internal gear, A, may be inclosed upon its two sides, so as to form a casing, J, in which the gear-wheel G can freely revolve, and if a lubricant is poured into said casing the parts lubricate themselves. As the gear-wheel G is of relatively large diameter compared with the internal gear, A, it is clear that large interdental spaces between the cogs can be employed. In the drawings only about one-third of the usual number of cogs are employed, which still brings at all times from two to three cogs into mesh. In laying out such a mechanical movement, the constructer has to simply bear in mind that the relative proportion between the throw of the crank and the gear G has to be the same as the desired proportion in which he wants to gear down. The diameter of the internal gear, A, is equal to the diameter of the gear G, plus the throw of the crank. The guide-rod B has to be made long enough to overcome the influence of the angularity caused by the fixed rest C.

In Fig. 2 I show a more mathematically-correct construction, and wherein the internal gear, A, is carried on two opposite sides by cranks D D, of equal throw, which are made to revolve at equal speed. The influence of the angularity caused by the rest C in Fig. 1 may be compensated by making the internal gear, A, slightly elliptical, with a vertical axis enough shorter than the horizontal axis to compensate for the loss of the vertical throw caused by the angularity. However, if the guide-rod B is made sufficiently long, the construction shown in Fig. 1 may be used for all practical purposes.

While I have shown two ways for giving to the internal gear-wheel, A, the prescribed motion, I do not want to limit myself to these devices alone.

I deem it important that the outer ring should be supported by the crank on its outer periphery, as it enables me to inclose the sides in such a manner as to keep out dust and grit from grinding the gearing, at the same time forming an oil-tight casing for holding the lubricating material, and, besides, a greater leverage is gained, and where a double support is used extra guides may be dispensed with.

I am aware of Patent No. 72,792, and lay no claim to anything shown therein as forming part of my invention.

What I claim as my invention is—

1. In a mechanical movement, the shaft H, having secured thereto the gear-wheel G, in combination with an internally-geared ring, A, surrounding the same and supported on and deriving its motion from the rotation of a crank-shaft, D E, passing through the outer circumference of said ring A, whereby a continuous rotary motion is imparted to said shaft H, substantially as described.

2. In a mechanical movement, the shaft H and wheel G, in combination with an internally-geared ring, A, surrounding the same and supported by and deriving its motion from the crank-shafts D E D E, passing through the outer circumference of said ring A, as and for the purpose set forth.

3. In a mechanical movement, a gear-wheel eccentrically journaled within an internal gear which is actuated by a circular motion similar to the strap of an eccentric, and produces thereby a continuous rotary motion of the inclosed gear-wheel, the external gear being inclosed oil-tight upon its sides, whereby a casing is formed which serves to protect the gearing, and forms an oil-cup for lubricating the same, substantially as described.

GEORGE YEOMANS.

Witnesses:
E. SCULLY,
JOHN HENRY.